Figure 3:
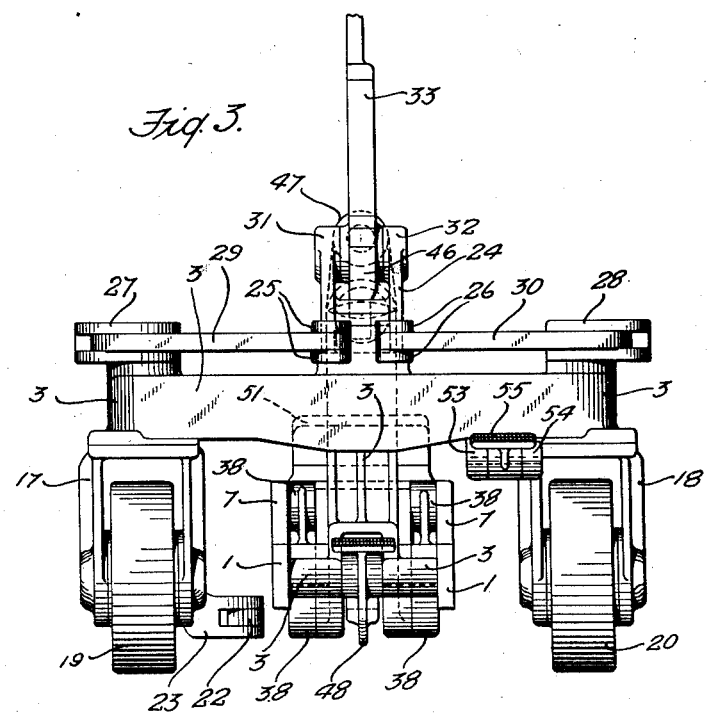

April 3, 1934. W. STUEBING, JR 1,953,872
LIFT TRUCK
Filed Nov. 11, 1930 3 Sheets-Sheet 1
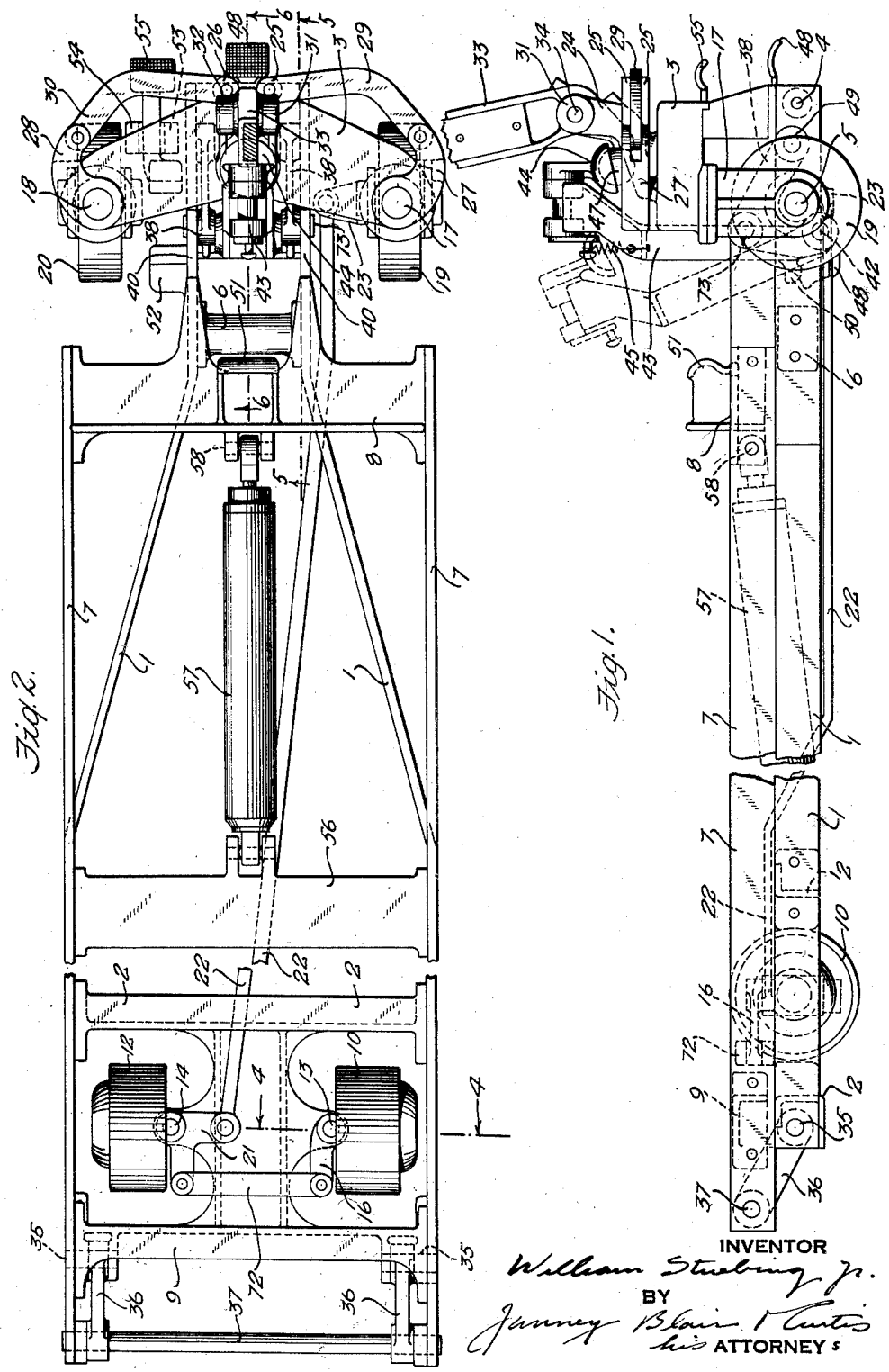

April 3, 1934.    W. STUEBING, JR    1,953,872
LIFT TRUCK
Filed Nov. 11, 1930    3 Sheets-Sheet 2

INVENTOR
William Stuebing Jr.
BY
Janney Blair & Curtis
his ATTORNEYS

April 3, 1934.     W. STUEBING, JR     1,953,872
LIFT TRUCK
Filed Nov. 11, 1930     3 Sheets-Sheet 3

INVENTOR
William Stuebing, Jr.
BY
Janney Blair & Curtis
his ATTORNEYS

Patented Apr. 3, 1934

1,953,872

UNITED STATES PATENT OFFICE 1,953,872

LIFT TRUCK

William Stuebing, Jr., Cincinnati, Ohio, assignor to The Yale & Towne Manufacturing Company, Stamford, Conn., a corporation of Connecticut Application November 11, 1930, Serial No. 494,845

26 Claims. (Cl. 254—10)

The present invention relates to an improvement in lift trucks more particularly of the side lift type, although in some respects, applicable to other known types. One object thereof has been to provide a lift truck in which side lift operation and four-wheel steering are combined with devices for avoiding flying handle and whipping handle. In addition, it is desirable to provide a truck capable of being steered accurately and easily, particularly in backing the truck into position under a skid or platform. This operation frequently requires several attempts on the part of the operator before the truck is properly positioned. A further object of my invention has been to provide means for steering the four wheels in unison so that the rear end of the truck will be under control simultaneously with the front end. A further object of my invention has been to provide a truck which will operate more advantageously in a narrow space and particularly where the paths or aisles involve corners around which the truck must be moved. It is usual for several trucks to be moved together in a train, in which case the four-wheel steer feature above referred to greatly facilitates control of the trailers as they are moved around corners and through narrow spaces.

A further object has been to provide, in a truck of the character indicated, means to prevent accidental disengagement of the lifting handle and the load after the operator has once engaged the load to lift it into transporting position. Furthermore, it is contemplated that a truck embodying my invention shall have instrumentalities for locking the load in elevated or transporting position and for readily releasing the steering handle therefrom so that the truck may be moved about without danger of the load descending upon the steering handle and thus causing injury and damage.

As applied to side lift trucks, an object of my invention has been to overcome difficulties heretofore experienced by reason of the tilting or tipping of the truck when the elevating frame is lifted with the lifting tongue or handle deflected to a side position. This occurs in using trucks having a single front steering wheel or two steering wheels mounted to turn about the steering axis. In a structure employing my invention, the front steering wheels are mounted to turn on separate axes so related to the fulcrum of the lifting handle that when the latter is in a deflected or side position, said fulcrum occupies an effective position substantially between the vertical turning axis of one of the steering wheels and the vertical turning axis of the lifting handle. This arrangement of parts together with suitable means for effecting steering movement of the wheels conveniently referred to as the "automobile steer" provides a truck construction in which the tilting or overturning tendency above referred to is eliminated.

Figure 4:
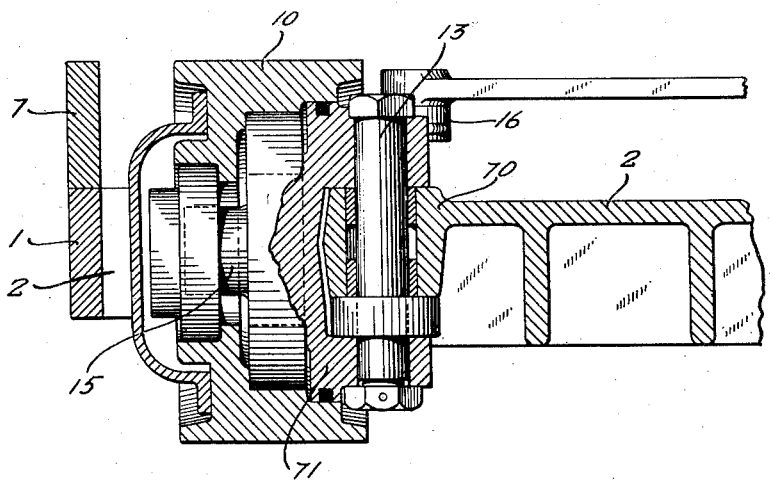
Figure 5:
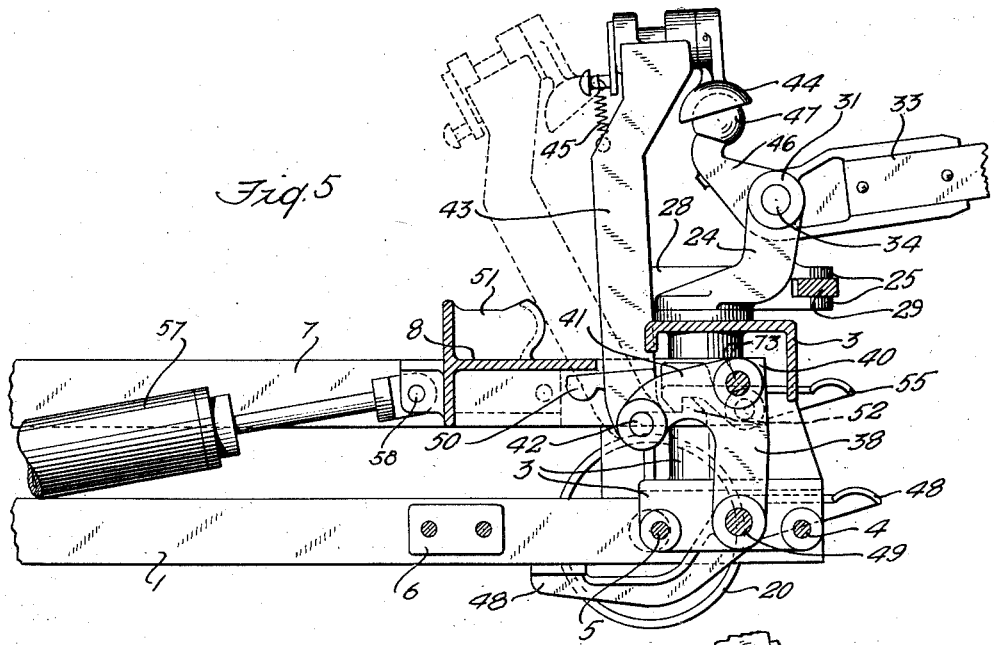

Other advantages and beneficial results in operation will be apparent from the following description of a preferred embodiment of my invention taken in connection with the drawings in which:

Figure 1 is a side elevation;
Figure 2, a plan view thereof;
Figure 3, a front end view in elevation;
Figure 4, a section on the line 4—4 of Figure 2;
Figure 5, a section on the line 5—5 of Figure 2; and
Figure 6, a section on the line 6—6 of Figure 2.

As seen more clearly in Figure 1, my improved lift truck in a preferred form includes a lower or main frame having side members or rails 1 and an upper or lifting frame having side members or rails 7. The lower frame is supported on four wheels, namely, the rear wheels 10 and 12 and the front wheels 19 and 20. A steering handle is operatively connected to said front wheels 19 and 20 and steering movement thereof is transmitted to the rear wheels by suitable connecting means. A check such as a dash pot or the like, 57, is operatively interposed between the main frame and the lifting frame to allow the gradual and easy descent of said lifting frame when released from elevated position.

The rear assembly of the main frame includes a transverse member, as a casting 2 of H shape, Figure 4, presenting wheel supporting bearings 70 upon each of which is pivotally mounted a bracket 71 having an axle extension 15, the wheels 10 being rotatably mounted thereon. An arm 16 of the bracket 71 is connected by means of a rod 72 with a bell crank lever 21 similarly connected to a similar bracket supporting the wheel 12. The bell crank lever 21 is also connected by means of a rod 22, Figure 2, with the forward steering assembly hereinafter to be described.

The forward end of the main frame supports the steering and lifting mechanism. As indicated more clearly in Figure 2, the side members or rails 1 of the main frame converge toward the front end of the truck and have mounted thereon adjacent to their forward ends, a transverse head 3 secured to said rails 1 by means of bolts 4 and 5 or the like, Figures 5 and 6. The forks 17 and 18 carrying front wheels 19 and 20 respectively are rotatably mounted or swiveled in the head 3 at opposite ends thereof, the shanks of said forks being provided with lever arms 27 and 28 respectively which are actuated to turn said forks and thus the wheels 19 and 20 by the turning of a steering handle 33. This handle is pivotally mounted on a steering head 24 rotatably supported in a centrally positioned bearing in the head 3, said head also being provided with lever arms 25, 26 to which the links 29 and 30 are pivotally connected at one end and at their other ends to arms 27 and 28 respectively.

In operation, when the steering handle 33 is deflected to the left or right, the steering head is similarly deflected and causes endwise movement of the links 29 and 30 which in turn actuate the arms 27 and 28 to turn wheels 19 and 20 in the same direction. The forward end of rod 22, previously referred to, is connected to the forward steering assembly through a lever arm 23 extending inwardly from the fork 17, Figure 3. Thus, turning movement of the front steering wheels is transmitted simultaneously to the rear wheels.

It will also be apparent that, instead of rotating about the axis of steering head 24, as in known truck constructions, the wheels 19 and 20 swivel in their bearings at the ends of transverse head 3, thus affording substantially the same lateral supporting and stabilizing effectiveness in all operative positions of the lifting and steering handle 33. This stability in operation becomes increasingly important as the lifting handle is operated from positions representing arcs of 45° and more from its central or straight-ahead position.

Figure 6:
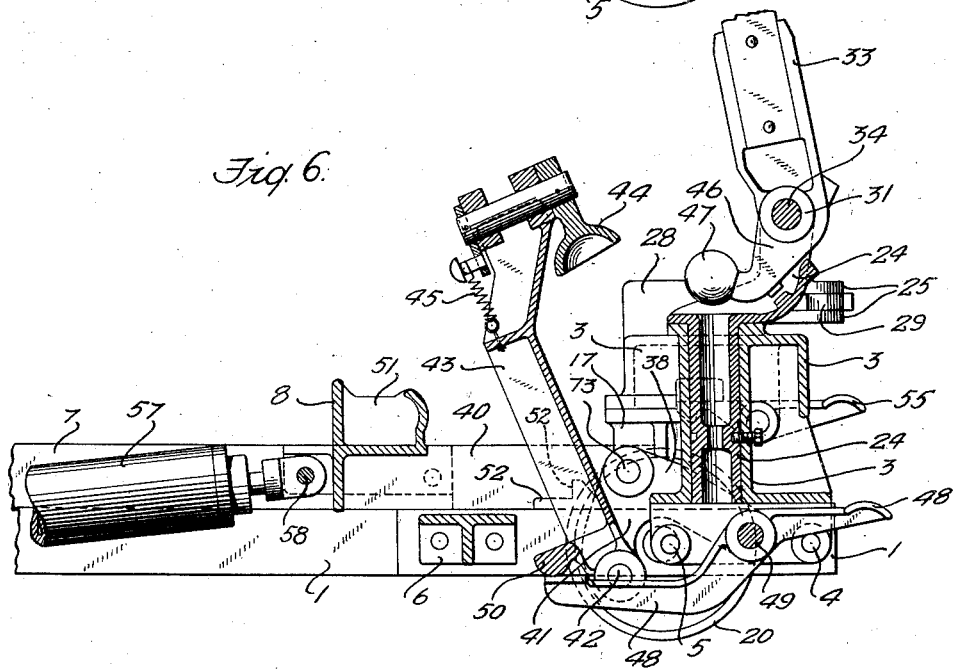

The mechanism for effecting the raising and lowering of the upper or lifting frame from lateral as well as forward position will be better understood by reference to Figures 5 and 6. The forward end of the lifting frame, comprising extensions 40 of the side members 7, is pivotally secured at 73 to bell crank levers 38 having their forward ends, Figure 6, pivoted on end portions of pins 49, Figure 5, between the rails 1 and adjacent portions of the head 3. A yoke-shaped connecting member 43 is pivotally secured to the inner ends of said bell crank lever 38 at 42. In the illustrated embodiment of my invention an upper portion of the connecting member 43 carries a pivotally mounted ball socket 44 retained normally in central position by means of a spring 45. The socket 44 is adapted to cooperate with a ball 47 forming the terminal of an extension 46 of the steering arm 33 which, as indicated more clearly in Figures 5 and 6, is pivotally mounted at 34 between the spaced ends 31 and 32 of the fork forming the upward extension of head 24. The connecting member 43 also carries an arm 50, Figure 6, which is positioned to be engaged by the inner end of a treadle 48 also pivoted on the pin 49. By depressing the outer or exposed end of treadle 48, the upper or free end of the connecting member 43 is deflected forwardly toward and into such position that, when the steering handle 33 is deflected forwardly or downwardly in any operative steering position thereof the ball 47 will engage the socket, and continued downward deflection of the free end of the steering handle with its free end in either forward or lateral position will cause connecting member 43 to be raised or lifted, thus turning bell crank lever 38 around pivot 49 and thereby raising the lifting frame which is supported at its rear end in relation to the lower or main frame by means of links 36 pivotally secured at 35 to said main frame and at 37 to said lifting frame. The lifting position of connecting member 43 is illustrated in full lines in Figure 1, the disconnected position being indicated in dotted lines in the same figure.

Referring now to Figure 2, a detent or hook 52 projects laterally from extension 40 of the lifting frame saddle 8 and is positioned to be engaged by the inner or hooked end of a latch 55, preferably in the form of a treadle pivotally mounted between the bearings 53 and 54. Thus, when the lifting frame reaches its uppermost or elevated position as indicated in Figure 5, the hook 52 is engaged by the inner end of the latch or treadle 55 to hold the lifting frame in elevated position. With the lifting frame in this position, the free end of the steering handle is normally in lowered position. However, as soon as the latch 55 effectively engages hook 52, the steering handle 33 is freed from lifting connection with the lifting frame simply by raising the free end of said handle whereupon the ball 47 disengages from the socket 44 and the connecting member 43 falls back against stop 51 to the position indicated in dotted lines in Figure 5. With the parts in this position, the truck may be moved freely in any direction without fear of the load or loaded lifting frame being released suddenly or accidentally into operative engagement with the ball 47 and thus with the steering handle.

It will be apparent from the foregoing description and stated mode of operation that my improved construction presents a combination of advantages which distinguish it materially from lift truck constructions heretofore commonly used or known to me. With the whipping handle and the flying handle eliminated, with the steering mechanism adapted to permit accurate and rapid movement of the truck even in narrow or tortuous paths, and with stability against tilting during side lifting, my improved construction presents a complete and commercially usable lift truck unit of high efficiency.

I claim as my invention:

1. In a lift truck, the combination of a main frame, an elevating frame mounted thereon, a steering head mounted on said main frame, a lifting and steering lever pivotally secured to said head and rotatable therewith into various steering planes, means for effecting elevation of the elevating frame at all operative steering positions of the lifting and steering lever, front steering wheels individually swiveled on said main frame, and means connecting said wheels to said steering lever at all times.

2. In a lift truck, the combination of a main frame, an elevating frame mounted thereon, a steering head mounted on said main frame, a lifting and steering lever pivotally secured to said head, means for effecting elevation of the elevating frame at all operative steering positions of the lifting and steering lever, front steering wheel carriers mounted in bearings having a fixed relation to the main frame at all operative steering positions of the lifting and steering lever, and means of connection between said steering wheels and said lever.

3. In a lift truck, the combination of a main frame, an elevating frame mounted thereon, a steering head mounted on said main frame, a lifting and steering lever pivotally secured to said head and rotatable therewith into various steering positions, means for effecting elevation of the elevating frame at all operative steering positions of the lifting and steering lever, a pair of front steering wheel carriers each mounted to turn in respect to its individual vertical turning axis during lateral movement of the lifting and steering lever, and means connecting said wheel carriers for actuation by said lever.

4. In a lift truck, the combination of a main frame, an elevating frame mounted thereon, a steering head mounted on said main frame, a lifting and steering lever pivotally secured to said head and rotatable therewith into various vertical steering planes, means for effecting elevation of the elevating frame at all operative steering positions of the lifting and steering lever, a pair of front steering wheel carriers operatively connected to said lever and each mounted to turn in respect to its individual vertical turning axis during lateral movement of the lifting and steering lever.

5. In a lift truck, the combination of a main frame, an elevating frame mounted thereon, a steering head mounted on said main frame, a lifting and steering lever pivotally secured to said head, means for effecting elevation of the elevating frame at all operative steering positions of the lifting and steering lever, and front and rear steering wheel carriers operatively connected with said steering lever to turn with lateral turning movement of the lifting and steering lever.

6. In a lift truck, the combination of a main frame, an elevating frame mounted thereon, a steering head mounted on said main frame, a lifting and steering lever pivotally secured to said head, means operatively interposed between the main frame and said lever for elevating the elevating frame when the free end of the lever is pressed downwardly, supporting wheels for front and rear portions respectively of said main frame, and means operatively connecting said wheels with the lifting and steering lever to effect steering movement of the wheels when the lever is moved laterally.

7. In a lift truck, the combination of a main frame, an elevating frame mounted thereon, a steering head mounted on said main frame, a lifting and steering lever pivotally secured to said head, means operatively interposed between the main frame and said lever for elevating the elevating frame when the free end of the lever is pressed downwardly, a pair of front wheels, a pair of rear wheels, and means operatively connecting said pairs of wheels with the lifting and steering lever to effect steering movement of the wheels when the lever is moved laterally.

8. In a lift truck, the combination of a main frame, an elevating frame mounted thereon, a steering head mounted on said main frame, a lifting and steering lever pivotally secured to said head, front steering wheel carriers individually swiveled on the main frame, a lever arm having a free end for turning each carrier on its vertical axis, a lever arm movable with rotation of the steering head and having a free end, and a connecting member between the free end of said carrier lever arm and the free end of said steering head lever arm to impart steering movement from said head to said steering wheel carrier.

9. In a lift truck having a lifting and steering lever, the combination of an elevating frame, means operable by said lever to elevate said frame a main frame comprising spaced side rails, front steering wheels connected to said lifting and steering lever means for supporting rear wheels between said rails, and means for supporting said front steering wheels opposite outwardly exposed sides of said side rails and in substantial spaced relation relatively to said rear wheels to prevent tipping of the truck when the lifting and steering lever is operated to lift the elevating frame from a side position.

10. A lifting truck comprising a main frame, an elevating frame, links interposed between forward end portions of said frames and having pivotal connection with said main frame and said elevating frame respectively, a lifting and steering lever, lifting means operable by said lever and including a lifting link mounted for substantially vertical movement during upward movement of said elevating frame and being connected to said first mentioned links rearwardly of the line between said pivotal connection thereof with said main frame and said elevating frame, steering wheel carriers individually swiveled on said main frame, and means operatively connecting said carriers with said lever.

11. A lifting truck comprising a main frame having swiveled steering head, an elevating frame mounted on the main frame, a steering lever operatively connected to said steering head, means for operatively connecting said elevating frame and said steering lever to actuate said elevating frame including a link operatively connected to said elevating frame but disconnected from said steering lever and means for moving said link into operative position in the path of movement of a portion of said steering lever, said portion being arranged to readily engage said link when in said operative position in all usual steering positions of said swiveled steering head, and steering wheel carriers individually swiveled on said main frame, and means operatively connecting said carriers for steering movement with said steering head.

12. In an elevating truck, the combination of load supporting means, steering mechanism comprising individually swiveled steering wheel carriers, a lever pivotally mounted to swing vertically, means including a member connected to said load supporting means and rigid cooperating means integral with said lever and operable by vertical swinging movement in any usual steering position of the lever to make contact with said member and raise said load supporting means, and means operatively connecting said lever with said carriers.

13. In an elevating truck, the combination of supporting and steering wheels, load supporting means carried by said wheels, means intermediate said wheels and said load supporting means permitting the latter to be raised while remaining substantially parallel to the ground, steering mechanism having a lever pivotally mounted to swing vertically and provided with an integral rigid rearward extension, a member connected to said load supporting means and having a downwardly facing surface arranged to be engaged by said extension and raised to its highest position by one stroke of said lever when the latter is depressed in any usual steering position, said surface being shaped to permit horizontal turning movement between it and said extension, and individually swiveled steering wheel carriers operatively connected for steering movement with said lever.

14. In an elevating truck, the combination of load supporting means, steering mechanism including individually swiveled steering wheel carriers and a lifting lever pivotally mounted to swing vertically, means including a member flexibly connected to said load supporting means and rigid cooperating means upon said lever operable by vertical swinging movement in any usual steering position thereof to raise and lower said load supporting means, and means operatively connecting said lever with said steering wheel carriers.

15. In an elevating truck, the combination of load supporting means, steering mechanism comprising individually swiveled steering wheel carriers, a lever pivotally mounted to swing vertically, means including a member flexibly connected to said load supporting means and a cooperating member rigid with said lever and operable by vertical swinging movement of the lever when in any usual steering position to raise and lower said load supporting means, and means operatively connecting said lever and said carriers.

16. A lifting truck comprising a main frame, an elevating frame, a link operatively connected to said elevating frame and having a free end, an arm mounted for angular movement on said free end and having a downwardly exposed bearing surface, a steering lever, means on the steering lever presenting an upwardly exposed bearing surface positioned and adapted to engage said downwardly exposed bearing surface during frame elevating operation of said link at all usual steering positions of said steering lever, steering wheel carriers individually swiveled on said main frame, and means operatively connecting said carriers and said steering lever.

17. In a lifting truck, a main frame, an elevating frame, means mounting said elevating frame for upward movement relatively to said main frame, a lifting and steering lever, operatively unitary means connecting said lever with said elevating frame and adapted to permit lifting operation of said lever in various vertical planes, means between said second named means and said elevating frame to permit longitudinal movement of said elevating frame relatively to said second named means during the lifting operation, steering wheel carriers individually swiveled on the main frame, and means operatively connecting said lever and said carriers.

18. In a lifting truck, a main frame, an elevating frame, means mounting said elevating frame for upward movement relatively to said main frame, a lifting and steering lever, operatively unitary means connecting said lever with said elevating frame and adapted to permit lifting operation of said lever in various vertical planes, means between said second named means and said elevating frame to permit longitudinal movement of said elevating frame relatively to said second named means during the lifting operation, steering wheel carriers individually swiveled in the main frame, and means operatively connecting said lever and said carriers.

19. In a lifting truck, a main frame, an elevating frame, means mounting said elevating frame for upward movement relatively to said main frame, a lifting and steering lever, operatively unitary means connecting said lever with said elevating frame and adapted to permit lifting operation of said lever in various vertical planes, means between said second named means and said elevating frame to permit longitudinal movement of said elevating frame relatively to said second named means during the lifting operation, said means and parts being so shaped and positioned that when said second named means is connected with said lever when the latter is in upright position, said connection automatically remains effective, while slight and upward movement of said lever when said elevating frame is in raised position will cause automatic disconnection, steering wheel carriers individually swiveled on said main frame, and means operatively connecting said lever and said carriers.

20. A lifting truck comprising a main frame, steering wheel carriers individually swiveled thereon, an elevating frame, a lifting and steering lever, pivoted links supporting the forward end of the elevating frame on the main frame and movable to substantially vertical position as the elevating frame is raised, elevating means operatively connected with the steering lever and connected to the links in such position that the point of connection thereto moves substantially vertically during the lifting of the elevating frame in any operative position of the lifting lever, and means operatively connecting said lever with said carriers.

21. A lifting truck comprising a main frame, steering wheel carriers individually swiveled thereon, an elevating frame movable upwardly and longitudinally relatively to said main frame, a lifting and steering lever, pivoted links supporting the elevating frame on the main frame and movable about the pivot as the elevating frame is raised and moved longitudinally with lifting movement of said lever, elevating means connected to said lever and to the links in such position that the point of connection thereto moves substantially vertically while the point of connection between the links and the elevating frame moves upwardly and longitudinally, and means operatively connecting said lever with said carriers.

22. A lifting truck comprising a main frame, an elevating frame, means mounting said elevating frame for upward movement relatively to said main frame, a pair of front steering wheels individually dirigibly mounted on said main frame, a steering lever adapted to rotate into different vertical planes for steering said dirigible wheels and for manipulating said truck, and lifting mechanism for elevating said elevating frame operable by said steering lever when it is in any of its vertical steering planes.

23. In a lifting truck, a main frame, an elevating frame, means mounting said elevating frame for upward movement relatively to said main frame, individually, dirigibly mounted and relatively widely spaced steering wheels carried by said main frame, a steering lever movable into various vertical steering planes and connected to said dirigibly mounted wheels for manipulating the same, and lifting mechanism for said elevating frame operable by said steering lever while the same is in any vertical steering plane.

24. In a lifting truck, a main frame, a steering head, an elevating frame, a pair of front steering wheels carried by said main frame, said wheels being dirigibly mounted and widely spaced, leverage connecting said dirigibly mounted wheels to said steering head, a lever carried by said steering head and rotatable therewith into various vertical planes to operate said dirigible wheels, and lifting mechanism for said elevating frame operable by said lever in any of its vertical steering planes.

25. In a lift truck having a lifting and steering lever, the combination of an elevating frame, a main frame, means for supporting rear and front wheels relatively to said main frame, said front and rear wheels being inter-connected for steering operation by said lifting and steering lever, and lifting means for said elevating frame operable by said steering lever.

26. A lifting truck comprising a main frame, an elevating frame, means mounting said elevating frame for upward movement relatively to said main frame, a pair of steering wheels individually dirigibly mounted on the front end of said main frame, a steering lever also mounted on the front end of said main frame, and adapted to be rotated for steering said dirigible wheels and for manipulating said truck, and lifting mechanism for elevating said elevating frame operable by said steering lever when it is in any of its steering positions.

WILLIAM STUEBING, JR.